Dec. 22, 1936.   W. A. STROUD   2,064,861
DRINK MIXING APPARATUS
Filed July 3, 1933
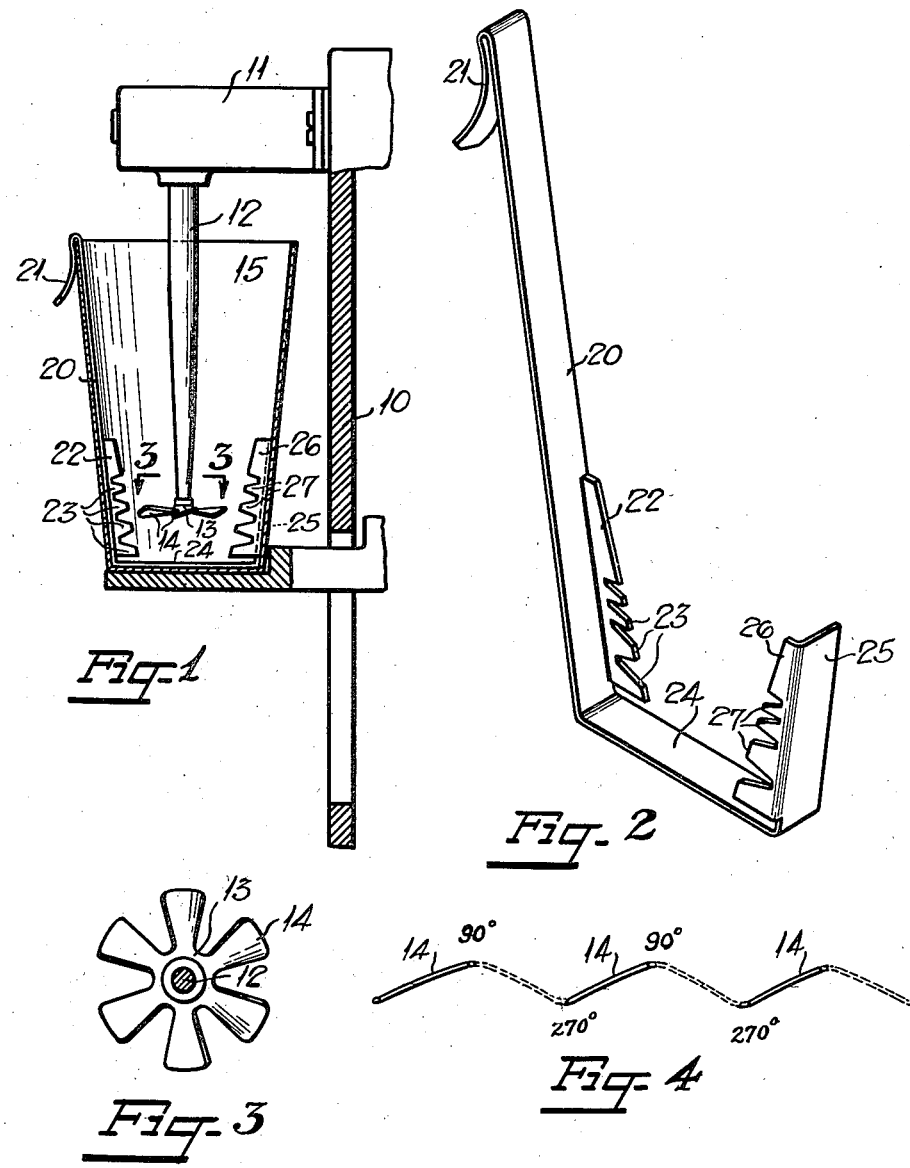
WILLIAM A. STROUD
Inventor Patented Dec. 22, 1936

2,064,861

UNITED STATES PATENT OFFICE 2,064,861

DRINK MIXING APPARATUS

William A. Stroud, Wilkesboro, N. C., assignor, by direct and mesne assignments, of one-half to Gilliam-Stroud, Inc., North Wilkesboro, N. C., and one-half to I. D. Blumenthal, Charlotte, N. C.

Application July 3, 1933, Serial No. 678,798

1 Claim. (Cl. 259—108)

This invention relates to drink mixers and more especially to a device adapted to be placed in the drink container, which in cooperation with an especially designed agitator, is calculated to thoroughly mix the drink and to break up solid and semi-solid substances therein, such as ice cream and the like.

An object of this invention is to provide a device which is adapted to be detachably inserted into a container for a drink mixer which holds the ingredients of the beverage to be mixed, so that the device will engage the ingredients of the beverage and disintegrate the same.

A further object of the invention is to provide means adapted to be associated with a container in drink mixers which will assist the agitator in breaking up bodies of ice cream and the like, forming a part of the beverage to be mixed, said means being detachable from the container so that the same can be easily and quickly cleaned and not interfering with the cleansing of the container itself.

Some of the objects of the invention having been stated, the details of the invention will more fully appear, when taken in connection with the accompanying drawing, in which—

Figure 1 is a vertical sectional view taken through a container positioned in a drink mixer and showing my invention in elevation and being positioned in the container;

Figure 2 is an isometric view of the device for insertion into the container;

Figure 3 is a view taken along the line 3—3 in Figure 1 and showing in plan the agitator;

Figure 4 is a developed view of the agitator or a portion of the perimeter thereof, with the cut-away portions being shown in dotted lines.

Referring more specifically to the drawing, the numeral 10 designates the framework of a drink mixer as shown in Patent Number 1,846,405 of February 23, 1932, though it is evident that this invention can equally be used on a conventional drink mixer, which does not have the up and down movement imparted to the container. Numeral 11 designates the bearing portion for the agitator shaft 12, said bearing portion in case of a conventional drink mixer occupying the position of the conventional electric motor for driving the agitator shaft. The agitator shaft 12 has secured on the lower end thereof an agitator 13 having a plurality of blades 14 designed to propel the mixture in the container 15 downward. These blades are peculiarly disposed to produce a desired swirling action on the contents of the container.

The container can be supported in any conventional manner, but in the drawing, corresponding to said patent the vertically movable support 16, is shown.

In the ordinary container for holding the beverage to be mixed in a drink mixer, the interior of the container necessarily must be smooth in order for the same to be easily cleansed. This smooth sidewall offers little resistance to the whirling contents in the container and hence very hard ice cream when placed in a drink, will not be broken up and caused to be melted and become an integral part of the beverage. In order to easily and quickly break up such particles as ice cream and other solid or semi-solid ingredients of a beverage, I provide a member 20 having a hooked portion 21 at the upper end thereof, which portion is spring-like and clamps onto the upper edge of the container. The portion 20 has a projecting portion 22 having teeth 23 therein, the teeth becoming longer as they progress towards the bottom of the portion 22. A portion 24 may lie flush with the bottom of the container, or in case the container is longer than the one shown in the drawing, it would be disposed transversely of the vertical axis of the container. The portion 24 has projecting upwardly and outwardly therefrom to conform to the sidewalls of the container, a portion 25 which has a projection 26 integral therewith, having teeth 27 therein, which teeth gradually become longer as they near the bottom of the container.

It is seen that this member 20 and its associated portions may easily be removed from the container for cleansing both the container and the member insertable therein. It is also seen that the teeth 23 and 27, along with their supporting portions speedily break up ice cream and other substances and also assist in a thorough mixing of the ingredients of the beverage.

In Figure 4 is shown a developed view of a portion of the perimeter of the agitator. The agitator is formed as a stamping, the perimeter of which represents a plurality of sine curves, and the downwardly projecting portion of each sine curve is cut away, which is the portion between 90 degrees and 270 degrees of each sine curve. This leaves the peculiarly shaped blades which act as an agitator for the ingredients to be mixed.

In the drawing and specification there has been set forth a preferred embodiment of the invention and although specific terms are employed, they are used in a generic and descriptive sense only and not for purposes of limitation, the scope of the invention being set forth in the appended claim.

I claim:

Agitating means for a drink mixer having a container and an agitator disposed within the container, an approximately U-shaped member having one leg longer than the other, the longer leg projecting above the upper edge of the container when in operable position in the container and having a reversely bent resilient clamping portion for engaging the outer surface of the container when the member is moved downwardly into operable position to clamp the member in operable position, the lower portion of the said leg portions having serrations disposed on the edges of the portions nearest the agitator for cooperating with the agitator in a mixing operation.

WILLIAM A. STROUD.